3,275,636
AMINE HEXAFLUOTITANATES

Edwin C. Knowles, Poughkeepsie, N.Y., Edward L. Kay, Akron, Ohio, and Frederic C. McCoy, Beacon, N.Y., assignors to Texaco Inc., New York, N.Y., a corporation of Delaware
No Drawing. Filed Dec. 19, 1961, Ser. No. 160,642
8 Claims. (Cl. 260—270)

This invention relates to novel amine salts of fluotitanic acid and to lubricating compositions containing said salts. More particularly, this invention relates to fluotitanic acid salts of primary, secondary and tertiary amines and to lubricating compositions containing said salts.

The usefulness of many organo-titanate compounds such as titanate esters as lubricating oil additives has been seriously hindered by the lack of hydrolytic stability of such compounds. An advantage of the titanium compounds of the present invention is that they are hydrolytically stable, oxidation stable and thermally stable in both storage and use. The novel amine salts of the present invention are formed by the reaction of an amine and fluotitanic acid and are useful as a source of nitrogen and titanium in soil conservation and the plant tracer field and the higher molecular weight compounds containing 8 or more carbon atoms are useful as load carrying additives for mineral and synthetic base lubricating oils.

The present invention is concerned with these novel salts and with their use as lubricant additives.

The amine salt of fluotitanic acid of the present invention are represented by either the acid salts or neutral salts shown in the following general formulae:

$$(R''R'RN^+H)HTi^-F_6$$
$$(YN^+H_nH)HTi^-F_6$$
Acid salts
$$(R''R'RN^{++}H)_2Ti^=F_6$$
$$(YN^{++}H_nH)_2Ti^=F_6$$
Neutral salts wherein R is a hydrocarbyl radical or a hydroxy substituted hydrocarbyl radical containing at least one and preferably at least 8 to about 30 carbon atoms, R' and R'' are hydrogen, a hydrocarbyl radical or a hydroxy substituted hydrocarbyl radical containing 1 to about 24 carbon atoms, Y is a 4 or 5 membered di or trivalent cyclic radical consisting of hydrogen substituted carbon atoms, oxygen or nitrogen and $n$ is either 0 or 1.

The term hydrocarbyl when used herein denotes a monovalent hydrocarbon radical.

In accordance with the present invention, novel amine salts of fluotitanic acid compositions are prepared by reacting a fluotitanic acid with an amine containing 1 or more carbon atoms and preferably at least 8 to 30 carbon atoms. The reaction mixture is diluted with a solvent, heated to reflux temperature at normal atmospheric pressure and solvents removed as an azeotrope. The reaction is filtered, if necessary, solvent stripped at atmospheric pressure and the amine salt of the present invention is obtained.

The amines employed in the formation of the novel amine salts of fluotitanic acid may be primary, secondary or tertiary aliphatic amines, cycloaliphatic amines, hydroxy substituted aliphatic amines, aromatic amines or heterocyclic amines and represented by the following formulae:

$$R''R'RN$$
and
$$YNH_nH$$

wherein R is a hydrocarbyl radical or a hydroxy substituted hydrocarbyl radical containing one and preferably at least 8 to about 30 carbon atoms, R' and R'' are hydrogen, a hydrocarbyl radical or a hydroxy substituted hydrocarbyl radical containing 1 to about 24 carbon atoms, Y is a 4 or 5 membered di or trivalent cyclic radical consisting of hydrogen substituted carbon atoms, oxygen or nitrogen and $n$ is either 0 or 1.

Examples of effective primary, secondary and tertiary aliphatic and alkanol amines are ethylamine, ethanolamine, isopropylamine, isopropanolamine, n-propylamine, 2-ethylhexylamine, hexanolamine, n-amylamine, triamylamine, t-octylamine, laurylamine, caprylamine, tricaprylylamine and mixtures of primary aliphatic amines such as commercially available mixtures of t-alkyl primary amines. Such t-alkyl primary amine mixtures include branched chain t-alkyl amines containing a mixture of 11 to 14 carbon atoms and mixtures of 18 to 22 carbon atoms.

Examples of cycloaliphatic amines are cyclohexylamine, cyclopentylamine, methylcyclohexylamine and ethylcyclohexylamine.

Examples of effective aromatic amine compounds are aniline, phenylenediamine, diphenylamine, N-methylaniline, N-ethylaniline, triphenylamine, xylidene, and benzylamine.

Examples of effective cyclic amine compounds are pyrrole, pyrrolidine, pyridine, piperidine, quinoline, isoquinoline and morpholine.

The fluotitanic acids employed in the formation of the compounds of the present invention are transitory acids and as such do not exist in the isolated state. They do, however, form stable salts. The acids are formed by reacting titanium fluoride with hydrofluoric acid, the reaction for which may be represented by the following equation:

$$TiF_4 + 2HF \rightarrow H_2TiF_6$$

Although such a compound is not isolatable, it exists in an aqueous solution and is commercially available in that form. For example, fluotitanic acid, $H_2TiF_6$, is available in 40%–60% aqueous solution.

Upon formation of the transitory acids described above, the amine is reacted therewith to obtain the amine salts of the present invention, the reaction for which can be represented by the following general equations:

$$R''R'RN + H_2TiF_6 \rightarrow (R''R'RN^+H)HTi^-F_6$$
$$2R''R'RN + H_2TiF_6 \rightarrow (R''R'RN^{++}H)_2Ti^=F_6$$
$$YNH_nH + H_2TiF_6 \rightarrow (YN^+H_nH)HTi^-F_6$$
$$2YNH_n + H_2TiF_6 \rightarrow (YN^{++}H_nH)_2Ti^=F_6$$

wherein the representative characteristics are identical as disclosed in column 1, supra.

Amine salts of the present invention are illustrated by the following: $C_{11}$–$C_{14}$ t-alkyl primary amine fluotitanate, $C_{18}$–$C_{22}$ t-alkyl primary amine fluotitanate, triamylamine fluotitanate, ethanolamine fluotitanate, hexadecyldimethylamine fluotitanate, octylamine fluotitanate, trioctylamine fluotitanate, decylamine fluotitanate, triphenylamine fluotitanate, phenylenediamine fluotitanate, diphenylamine fluotitanate, triphenylamine fluotitanate, benzylamine fluotitanate, pyrrole fluotitanate, pyrrolidine fluotitanate, pyridine fluotitanate, piperidine fluotitanate, quinoline fluotitanate, isoquinoline fluotitanate, morpholine fluotitanate, cyclohexylamine fluotitanate, cyclopentylamine fluotitanate, methyl cyclohexylamine fluotitanate and ethylcyclohexylamine fluotitanate.

The preparation of specific novel acid amine salts of fluotitanic acid of the present invention is illustrated in the following examples.

EXAMPLE I.—PREPARATION OF THE NEUTRAL AMINE SALT OF FLUOTITANIC ACID 158 grams (0.5 mol) of t-$C_{18}$–$C_{22}$ alkyl primary amine were charged to a 1 liter flask along with 100 mls. of toluene. To this blend 68 grams (0.25 mol) of a 60% by weight aqueous solution of fluotitanic acid were added slowly with stirring. The temperature rose from 30° C. to 65° C. The reaction mixture was heated to reflux temperature and 27 mls. of water were removed by azeotropic distillation. The toluene was then distilled off, the last traces being stripped off with a stream of nitrogen. A clear, dark amber viscous liquid soluble in mineral oil and di-2-ethylhexyl sebacate was obtained and identified as t-$C_{18}$-$C_{22}$ alkyl primary amine fluotitanate.

EXAMPLE II.—PREPARATION OF NEUTRAL TRIAMYLAMINE SALT OF FLUOTITANIC ACID 227 grams (1.0 mol) triamylamine and 100 mls. of toluene were charged to a 1 liter flask. 136 grams (0.5 mol) of 60% by weight aqueous solution of fluotitanic acid were added slowly with stirring. The temperature rose from 30° C. to 75° C. 44 mls. of water were removed by azeotropic distillation and the reaction product formed a gel. 300 additional mls. of toluene were added and 8 more mls. of water removed. After 240 mls. of toluene had been distilled the reaction product was identified as triamylamine fluotitanate.

EXAMPLE III.—PREPARATION OF THE NEUTRAL HEXADECYLDIMETHYLAMINE SALT OF FLUOTITANIC ACID 134 grams (0.5 mol) of hexadecyldimethylamine and 50 mls. of toluene were charged to a 500 ml. flask and 68.5 grams (0.25 mol) of 60% by weight aqueous solution of fluotitanic acid were added slowly with stirring. The resulting product was a soft gel. 50 additional mls. of toluene were added and 26 mls. of water removed by azeotropic distillation. A small amount of silicone was added to control foaming. After 50 mls. of toluene had been removed the product became a very thick gel and was identified as hexadecyldimethylamine fluotitanate.

EXAMPLE IV.—PREPARATION OF THE NEUTRAL TRIOCTYLAMINE SALT OF FLUOTITANIC ACID 198 grams (0.5 mol) of trioctylamine and 100 mls. of toluene were charged to a flask and stirred. 68 grams (0.25 mol) of a 60% aqueous solution of fluotitanic acid were added dropwise. The temperature rose from 32° C. to 63° C. The reaction products were heated to reflux and 26 mls. of water were isolated. The solvent volatiles were removed by distillation and a slightly hazy yellow viscous liquid identified as trioctylamine fluotitanate was isolated.

EXAMPLE V.—PREPARATION OF THE NEUTRAL TRIETHANOL AMINE SALT OF FLUOTITANIC ACID 74.5 grams, 0.5 mol, of triethanol amine and 100 mls. of toluene were charged to a flask equipped with a stirrer and condenser. 68 grams of a 60% by weight aqueous solution, 0.25 mol of fluotitanic acid were added slowly with stirring. An exothermic reaction took place and the temperature rose from 29° C. to 80° C. The reaction mixture was then heated to reflux and 27 mls. of water removed. Toluene was stripped out at a pot temperature of 150° C. 110 grams of triethanol amine fluotitanate, a hazy greenish yellow liquid, was obtained resulting in a yield of 96.5%.

EXAMPLE VI.—PREPARATION OF NEUTRAL ANILINE SALT OF FLUOTITANIC ACID 46.5 grams, 0.5 mol, of aniline and 100 mls. of toluene were charged to a flask equipped with stirrer and condenser. 68 grams of a 60% by weight aqueous solution, 0.25 mol, of fluotitanic acid were added slowly with stirring. An exothermic reaction took place and the temperature rose from 25° C. to 65° C. The milky emulsion that formed was heated to reflux. After 17 mls. of water were removed the reaction mixture began to gel. 50 additional mls. of toluene were then added to fluidize the reaction mixture. The refluxing was continued until 27 mls. of water were removed. The reaction mixture was cooled and filtered and 87 grams of aniline fluotitanate, a light gray crystalline material, was obtained in a yield of 100%.

EXAMPLE VII.—PREPARATION OF NEUTRAL PYRIDINE SALT OF FLUOTITANIC ACID 39.5 grams, 0.5 mol, of pyridine and 100 mls. of toluene were charged to a flask equipped with a stirrer and condenser. 68 grams of a 60% by weight aqueous solution, 0.25 mol, of fluotitanic acid were added slowly with stirring. An exothermic reaction was evidenced and the temperature rose from 25° C. to 73° C. The reaction mixture was heated to reflux until 27 mls. of water were removed. The reaction mixture was cooled and filtered and 79 grams of pyridine fluotitanate, a white crystalline material, was obtained in a yield of 98.5%.

EXAMPLE VIII.—PREPARATION OF THE ACID PYRIDINE SALT OF FLUOTITANIC ACID 19.8 grams, 0.25 mol, of pyridine were charged to a flask and 68 grams of a 60% by weight 0.25 mol of fluotitanic acid were added slowly with stirring. An exothermic reaction was evidenced by a temperature rise of 28° C. to 64° C. The reaction mixture was then refluxed and a clear colorless solution resulted which was identified as pyridine acid fluotitanate and identified by a nitrogen analysis of 5.1% with a theoretical nitrogen content of 5.8%.

An attempt was made to form other amine halotitanate salts other than the fluotitanate salts prepared above. However, the amine halotitanates other than amine fluotitanates are unstable and will not form outside an aqueous solution and are therefore not isolatable. This is shown in Example IX:

EXAMPLE IX 100 grams of concentrated hydrochloric acid equivalent to 1 mol of hydrochloric acid were added to 100 mls. of deionized water and cooled in an ice bath. 95 grams, 0.5 mol, of titanium tetrachloride were thereafter added with stirring. A clear yellow solution of chlorotitanic acid was obtained. 315 grams, 1 mol, of t-alkyl $C_{18}$-$C_{22}$ primary amine were added slowly to the chlorotitanic acid prepared above with stirring. 100 mls. of toluene were added and heated to reflux. Hydrochloric acid was evolved continuously from the condenser. The theoretical amount of water was recovered but a large amount of sediment remained showing that amine salts of chlorotitanic acid are unstable except in aqueous solution.

The lubricating oils of this invention include hydrocarbon lubricating oils and synthetic lubricating oils. The hydrocarbon oils found to be useful for this invention include oils having a viscosity in the range required for lubricating fluids and in particular hydrocarbon mineral oils which include paraffin base, naphthene base, mixed paraffin-naphthene base and mineral oils of the residual or distillate type. The hydrocarbon lubricating base generally has been subjected to solvent refining to improve its oxidation and thermal stability and viscosity-temperature properties as well as solvent dewaxing to remove waxy components and to improve the pour properties of the oil. Broadly speaking, hydrocarbon lubricating oils having an SUS viscosity at 100° F. of between 50 to 2500 are used in the formulation of the improved lubricants of this invention.

The mineral lubricating oils to which the amine salts of this invention are added usually contain other additives designed to impart desirable properties thereto. For example, viscosity index improvers such as the polymethacrylates having a molecular weight ranging from 500 to 25,000 are usually included therein. The VI improver normally used is a polymethacrylate having the following recurring structural unit:

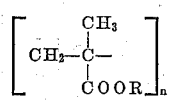

wherein R is an aliphatic radical ranging from butyl to stearyl and n is an integer of more than 1.

The use of various metal base organic type additives has been found effective and are generally incorporated in the lubricating oils of this invention, particularly those oils used in high speed, spark ignition and diesel engines to reduce ring sticking, minimize lacquer formation and carbon deposits.

The hydrocarbon lubricating oils of this invention may also contain other useful additives such as metal sulfonates to afford additional detergent-dispersant properties, metal di-alkyl dithiophosphates to afford additional corrosion and oxidation resistance, anti-foam agents such as silicone polymers in the amounts of about 5 to 200 parts per million, etc.

The esters which constitute the synthetic lubricant composition of this invention are broadly described as esters of hydrocarbyl carboxylic acids. They are high molecular weight materials of lubricating oil characteristics derived from alcohols which are usually aliphatic alcohols containing one or more carboxylic acid radicals.

Widely used synthetic ester lubricants are aliphatic diesters of aliphatic dicarboxylic acids containing 6–12 carbon atoms. From the standpoint of cost and availability, the preferred dibasic acids are adipic acid, sebacic acid and azelaic acid. The aliphatic alcohols used to form the diesters usually contain at least 4 carbon atoms and up to 20 or more carbon atoms. $C_6$ to $C_{18}$ alcohols are most commonly used. Ether alcohols such as Cellosolve and Carbitol may also be used in the formation of the aliphatic diesters of organic dicarboxylic acids used as the lubricating base in the compositions of this invention. Alcohols containing 2 or more hydroxyl radicals and no hydrogen substituted on the beta carbon atom such as trimethylol propane and pentaerythritol have proven particularly effective in formulating stable high temperature ester lubricants.

Examples of alkyl esters of aliphatic carboxylic acids are the following: di-isooctyl azelate, di-2-ethylhexyl sebacate, di-2-ethylhexyl azelate, di-2-ethylhexyl adipate, dilauryl azelate, di-sec-amyl sebacate, di-2-ethylhexyl alkenyl-succinate, di-2-ethoxyethyl sebacate, di-2-(2'-methoxyethoxy) ethyl sebacate, di-2-(2'-butoxyethoxy) ethyl sebacate, di-2-butoxyethyl azelate, di-2-(2'-butoxyethoxy) ethyl alkenyl-succinate, pentaerythritol tetracaproate and trimethylol propane tri-isooctanoate.

In addition to such esters, polyester lubricants formed by a reaction of an aliphatic dicarboxylic acid, a dihydroxy compound and a monofunctional compound, which is either an aliphatic monohydroxy alcohol or an aliphatic monocarboxylic acid, in specified mol ratios are also employed as the synthetic lubricating base in the compositions of this invention; polyesters of this type are described in U.S. 2,628,974 on Polyester Synthetic Lubricants, which issued to R. T. Sanderson on February 17, 1953. Polyesters formed by reaction of a mixture containing specified amounts of 2-ethyl-1,3-hexanediol, sebacic acid, and 2-ethylhexanol and by reaction of a mixture containing adipic acid, diethylene glycol and 2-ethylhexanoic acid illustrate this class of synthetic polyester lubricating bases.

The sulfur analogs of the above described esters are also used in the formulation of the lubricating compositions of this invention. Dithioesters are exemplified by di-2-ethylhexylthiosebacate, di-n-octyl thioadipate and the dilaurate of 1,5-pentanedithiol; sulfur analogs of polyesters are exemplified by the reaction product of adipic acid, thioglycol and 2-ethylhexyl mercaptan.

Alkyl-substituted phenols are usually incorporated in the lubricants of the invention as anti-oxidants. The preferred and most commonly used alkyl phenol anti-oxidants are 2,6-di-tertiary octylphenol; 2,6-di-tertiary amyl-4-methylphenol; and 2,6-di-isopropyl-4-methylphenol. Hindered phenols of this type are employed in concentrations between 0.1 and 2.0 weight percent.

Although hindered phenol type anti-oxidants are the most widely used anti-oxidants in the lubricant compositions of the invention, aryl-substituted amine anti-oxidants such as phenylnaphthylamine, phenylene diamine, and diphenylamine are also used in lubricants in conjunction with the extreme pressure additive of the invention. The amine anti-oxidants are employed in the same concentrations as the hindered phenol anti-oxidant.

Organic silicones are normally incorporated in the lubricants of the invention to impart thereto antifoam properties. The silicones are usually of the dialkyl or mixed alkylaryl silicone type. Dimethyl silicone is normally employed as the anti-foam agent. The silicone is incorporated in the lubricant by means of a kerosene concentrate containing 5 to 15 weight percent silicone. A very satisfactory antifoam agent is a kerosene concentrate 10 weight percent dimethyl silicone. The kerosene concentrate is employed in an amount sufficient to provide a silicone polymer concentration of from 50 to 250 parts per million based on the total lubricant composition.

To demonstrate the excellent improvement in the load-carrying ability of lubricating oils containing the amine salts, etc., of this invention, a high speed gear scuff test was used. This test, called the Ryder Gear Test, is intended for the evaluation of the scuff-limited load-carrying ability of those lubricants used in reduction and accessory drives of turbo-jet and turbo-prop engines. The method of test provides for the running of two spur gears in a Pratt and Whitney Gear and Lubricant Tester (also termed the Ryder Gear Tester). The oil inlet temperature to the gears was 165°±5° F. The face width of the driven gear was 0.937 inch and the face width of the driving gear was 0.25 inch. The dynamometer speed of the Gear Tester was 3830 r.p.m. (equivalent to a gear speed of 10,000 r.p.m.) and loading pressure of 2½ p.s.i. applied during break-in. After running for 10 minutes, the Tester was shut down and the driving gear removed and an estimate of the percentage of tooth area scuffed on each tooth of that gear was made. The gear was replaced and the above procedure continuously repeated using a higher loading pressure with increments of 5 p.s.i. at each repetition until 22.5 percent of the total tooth face area on the driving gear had been scuffed, the load corresponding to this point being considered the scuff load. Scuffing is defined as that degree of wear or abrasion which obliterates the axial grinding marks on the gear tooth. The loading pressures used were as follows: 2, 5, 10, 15, 20, 25, 30, 35, 40, 45, 50, 55, 60, 65, 70, 75, 80 p.s.i. and up. A tooth load conversion factor of 18.5 sq. in. which was a constant calculated from measured data from the Tester, was multiplied by the loading pressure at the scuff load and divided by the width of the driving gear (0.25) to obtain the tooth load in pounds per inch.

The results obtained using the above test procedure on various lubricating oil compositions including that of the invention are set forth in the following table. Base Oil A is pentaerythritol heptanoate ester. Base Oil B consists of a mixture of paraffin base crude oils which have been furfural refined, solvent dewaxed and clay filtered and has an SUS viscosity at 210° F. of 100.

*Table I*

HIGH SPEED RYDER GEAR TEST

| Oil: | Tooth load, p.p.i. |
|---|---|
| Base Oil A | 2,500 |
| Base Oil A+1.0 wt. percent trioctyl amine fluotitanate | 4,100 |

Base Oil B ............................................. 2,200
Base Oil B+1.0 wt. percent t-C$_{18}$–C$_{22}$ alkyl primary amine fluotitanate ............. 4,480+

Base Oil A and Base Oil B gave a Ryder Gear Test of 2500 p.p.i. and 2200 p.p.i. respectively as compared to 3000 p.p.i. minimum specified for jet engine lubricant use. Table I demonstrates the dramatic improvement in the load carrying ability of the base oils when the additives of the present invention are included therein. In the Ryder Gear Test values in excess of 4000 p.p.i. were obtained with all samples containing the amine fluotitanate salts of the present invention.

The dramatic load carrying ability of the compositions of the present invention is also demonstrated in the I.A.E. Gear Test which is one of the requirements of British Specification D.E.R.D. 2487, "Lubrication Oil, Aircraft Turbine Engine, Synthetic Type."

The results of the I.A.E. Gear and the Mean Hertz Load Tests on lubricating compositions of the present invention are set forth in the following table. Base Oil C consisted of a paraffin base crude which has been furfural refined, lightly acid treated solvent dewaxed and has an SUS viscosity at 100° F. of 150.

*Table II*

I.A.E. GEAR AND MEAN HERTZ LOAD TESTS

| Oil | I.A.E. Tooth Load, lbs. | Mean Hertz Load, Pounds |
|---|---|---|
| Base Oil C | 20 | 18 |
| Base Oil C+1.0 wt. percent t-C$_{18}$-C$_{22}$ alkyl primary amine fluotitanate | 145 | 38 |

Table II above further indicates the dramatic improvement afforded a base oil composition containing the amine-fluotitanate salts of the present invention.

The excellent oxidation-thermal stability of lubricating oil compositions containing the amine-fluotitanate salts of the present invention is also demonstrated in the General Motors Oxidation Test. The test was conducted using Base Oil C as previously described.

The General Motors Oxidation procedure is as follows:
The Saybolt Universal viscosity at 210° F. is determined on the original sample. Two hundred grams (±0.1 gram) of the original sample are weighed into a tared 400 ml. beaker; the beaker with its contents are placed on the turntable in the oven, which is maintained at 325° F. (±2° F.). The temperature of the oven is read from an ASTM Loss on Heat thermometer placed in one of the samples on the shelf. The thermometer is observed through the glass window, without opening the door. Rotation of the shelf is maintained at all times, even during temperature observation. The turntable is rotated at a speed of 5 to 6 r.p.m. After 100 hours, the beaker is removed from the oven, allowed to cool and reweighed. After the measurement of the evaporation loss, the lubricant is stirred thoroughly in order to distribute any precipitate uniformly throughout the oil. Approximately 10 grams of the lubricant are weighed out into an Erlenmeyer flask of 125 ml. capacity, noting the weight to 0.1 gram. The lubricant remaining after removing the samples for this test is retained for the viscosity test. By means of a graduated cylinder, 90 ml. of precipitation naphtha are added, the flask stoppered and shaken thoroughly and allowed to stand for one hour at a temperature of 25° C. At the end of the one hour period, the mixture is filtered through a Gooch crucible that has been previously dried and weighed. The precipitate is washed with a small amount of precipitation naphtha. The suction is allowed to continue for five minutes to dry the crucible. The crucible is placed in a drying oven at 105° C. for one hour and cooled in a desiccator and weighed. The lubricant remaining, after removing the samples for the "Insoluble Material Test," is allowed to stand undisturbed to allow any sediment to settle out.

The clear oil is then decanted. The Saybolt Universal Viscosity at 210° F. is determined upon the decanted portion of the sample.

*Table III*

GENERAL MOTORS OXIDATION TEST (100 HOURS AT 325° F.)

| | Percent Increase in 210° F. Kin. Vis. | Amount of Sludge |
|---|---|---|
| Base Oil C | 36.0 | Moderate. |
| Base Oil C+1.0 wt. percent t-C$_{18}$-C$_{22}$ alkyl primary amine fluotitanate | 5.46 | None. |

As shown by the test data in Table III above viscosity increase and the amount of sludge of the blend containing the additive of the present invention were significantly less than the values obtained on the base oil alone.

The anti-corrosive nature of the lubricant compositions of the present invention is shown by the data in Table IV below:

*Table IV*

McCOULL CORROSION TEST AT 350° F.

| Oil | 10 hour wt. loss, mgs. | 10 hour Neut. No. |
|---|---|---|
| Base Oil C | 19.5 | 2.8 |
| Base Oil C+1.0 wt. percent t-C$_{18}$-C$_{22}$ alkyl primary amine fluotitanate | 1.0 | 2.4 |

One of the outstanding features of the amine salts of fluotitanic acid of the present invention is their hydrolytic stability. This applies both to the water-soluble salts, such as pyridine fluotitanate, and also the lubricating oil-soluble salts such as t-C$_{18}$–C$_{22}$ alkyl primary amine fluotitanate.

As is clear from the foregoing disclosures and examples, considerable latitude may be exercised in the choice of the amine in forming the compounds of the present invention.

We claim:
1. The acid addition compound having the formula:

2. The acid addition compound selected from the group consisting of compounds represented by the formula (A) 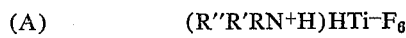

and (B) 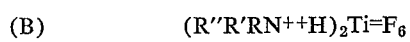

and the pyridine salt of hexafluotitanate where R is selected from the group consisting of alkyl groups and hydroxy-substituted alkyl groups having from 1 to 30 carbon atoms and a phenyl group, R' and R" are selected from the group consisting of hydrogen and an alkyl group containing from 1 to about 24 carbon atoms.

3. The acid addition compound t-C$_{18-22}$ alkyl primary amine hexafluotitanate.

4. The acid addition compound triamylamine hexafluotitanate.

5. The acid addition compound hexadecyldimethylamine hexafluotitanate.

6. The acid addition compound trioctylamine hexafluotitanate.

7. The acid addition compound triethanolamine hexafluotitanate.

8. The acid addition compound aniline hexafluotitanate.

(References on following page)

References Cited by the Examiner

UNITED STATES PATENTS

| | | | |
|---|---|---|---|
| 2,476,514 | 7/1949 | Smith | 260—270 |
| 2,490,705 | 12/1949 | Pearson et al. | 260—270 |
| 2,580,473 | 1/1952 | Sowa et al. | 260—242 |
| 2,628,942 | 2/1953 | Morris et al. | 252—49.7 |
| 2,745,832 | 5/1956 | Fath et al. | 260—270 |
| 2,795,553 | 6/1957 | Lowe | 252—49.7 |

OTHER REFERENCES

Muetterities: J. Am. Chem. Soc., vol. 82, pages 1082–87 (March 1960).

ALEX MAZEL, *Primary Examiner.*

JULIUS GREENWALD, NICHOLAS S. RIZZO, HENRY R. JILES, *Examiners.*

P. C. BAKER, DONALD G. DAUS, *Assistant Examiners.*